United States Patent
Distler et al.

[15] 3,687,886
[45] Aug. 29, 1972

[54] PRODUCTION OF POLYMERS HAVING BETAINE GROUPS CONTAINING SULFUR ATOMS

[72] Inventors: Harry Distler, Ludwigshafen; Rudi Widder, Eppelheim; Bernd Stanger, Ludwigshafen; Alfred Mueller, Ludwigshafen; Wolfgang Druschke, Frankenthal, all of Germany

[73] Assignee: Badische Anilin- & Soda-Fabrik Aktiengesellschaft, Rhineland-Pfalz, Germany

[22] Filed: Sept. 8, 1970

[21] Appl. No.: 70,545

[30] Foreign Application Priority Data

Sept. 20, 1960 Germany..........P 19 47 788.4

[52] U.S. Cl......260/29.6 TA, 117/138.5, 117/140 A, 204/159.22, 260/29.6 T, 260/29.6 MQ, 260/29.6 XA, 260/63 N, 260/78 A, 260/78.5 BB, 260/78.5 UA, 260/79.3 M, 260/80.6, 260/80.7, 260/80.72, 260/80.73, 260/85.5 ZA, 260/85.7, 260/247.1, 260/268 R, 260/456

[51] Int. Cl...............................................C08f 15/40
[58] Field of Search..260/29.6 TA, 29.6 T, 29.6 MQ, 260/29.6 XA, 29.6 SQ, 29.6 HN, 79.3 MU

[56] References Cited

UNITED STATES PATENTS 3,168,546  2/1965  Ballauf et al...............260/456

FOREIGN PATENTS OR APPLICATIONS 659,316   5/1965   Belgium............260/29.6 MQ
1,207,630 12/1965  Germany...........260/29.6 MQ
1,211,156 2/1966   Germany...........260/29.6 MQ

*Primary Examiner*—William H. Short
*Assistant Examiner*—L. M. Phynes
*Attorney*—Johnston, Root, O'Keeffe, Keil, Thompson & Shurtleff

[57]    ABSTRACT

New homopolymers and copolymers and their solutions or dispersions having numerous applications are prepared by homopolymerization or copolymerization of olefinically unsaturated sulfitobetaines in bulk, suspension, solution or emulsion.

7 Claims, No Drawings

PRODUCTION OF POLYMERS HAVING BETAINE GROUPS CONTAINING SULFUR ATOMS

This invention relates to the production of homopolymers and copolymers of olefinically unsaturated sulfitobetaines.

It has been known for a long time, for example from German Pat. No. 744,318, that stable aqueous dispersions of polymers of olefinically unsaturated monomers can be prepared by polymerizing small amounts of vinylsulfonic acids with other olefinically unsaturated monomers which are insoluble in water. Aqueous polymer dispersions prepared in this way have a fairly high viscosity which has a fairly strong dependence on pH.

It is moreover known from German Printed Application No. 1,207,630, that water-soluble copolymers of acrylamide can be prepared by copolymerizing acrylamide in aqueous solution with sulfobetaines which have a copolymerizable carbon-carbon double bond. If the polymerization by this prior art method is to be carried out at fairly low temperature, however, it is necessary to add a reducing agent.

Finally it is known for German Pat. No. 1,205,699 that aqueous dispersions of ethylene copolymers can be prepared by polymerizing ethylene in aqueous medium at a pH of from 5 to 9 at pressures of more than 100 atmospheres gauge in the presence of water-soluble catalysts that generate free radicals and in admixture with an amine containing at least one polymerizable carbon-carbon double bond or a salt or quaternization product thereof, the amounts of these comonomers being from 0.1 to 10percent by weight. Olefinically unsaturated sulfobetaines and sulfatobetaines are included among the comonomers in this method. In this method, too, it is necessary when polymerizing at relatively low temperatures to add reducing agents as well as the peroxidic compounds.

We have now found that polymers having betaine groups containing sulfur atoms are advantageously obtained in the polymerization of olefinically unsaturated monomers having betaine groups containing sulfur in the presence or absence of polymerization catalysts and/or inert diluents and/or other olefinically unsaturated monomers, by using olefinically unsaturated sulfitobetaines as the monomers having betaine groups containing sulfur atoms.

Olefinically unsaturated sulfitobetaines are new. They may be prepared for example as described in German Pat. No. 1,150,095 by the action of equimolar amounts of sulfur dioxide and alkylene oxides on amines which have an olefinically unsaturated radical, for example on olefinically unsaturated hydrocarbon radical such as an allyl group, a vinylbenzyl radical or a phenyl radical bearing a vinyl group as a substituent, or preferably a substituted alkyl radical, the substituent being a radical which has a carbon-carbon double bond activated in the α-position by a —COO—, —CONH—, —CON— or —CO— group. Sulfitobetaines having the general formula:

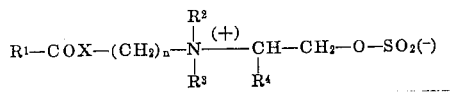
(I)

where X denotes an oxygen atom or an —NH— group, $R^1$ denotes an unsubstituted or substituted vinyl group, $R^2$ and $R^3$ denote alkyl groups, $R^4$ denotes a hydrogen atom or a lower alkyl or alkenyl radical having preferably one to four carbon atoms which may bear, as a substituent, a halogen atom, amide group, epoxy group or phenyl radical and $n$ denotes one of the integers from 1 to 18 are of particular interest for the new polymerization process. Sulfitobetaines having this general formula in which $R^2$ and $R^3$ are common members of a heterocyclic ring which may contain further hetero atoms, particularly an oxygen atom or a

radical, may also be used. The radical $R^1$—COX— is preferably derived from olefinically unsaturated monocarboxylic or dicarboxylic acids containing three to five carbon atoms such as acrylic acid, methacrylic acid, maleic acid, itaconic acid or fumaric acid. The index $n$ preferably denotes an integer from 2 to 8 and particularly from 2 to 4. Sulfitobetaines which are well suited are derived for example from esters of acrylic, methacrylic, maleic or fumaric acid with N,N'-dimethl-β-hydroxyethlamine, N,N-diethyl-β-hydroxyethlamine, N,N-dimethyl-γ-hydroxypropylamine or from the amides of acids of the said type and N,N-dimethyl-γ-aminopropylamine. Examples of these are N,N-dimethylaminoethyl-β-methacrylate and N,N-dimethyl-(γ-acrylamido)-propylamine.

Preferred sulfitobetaines having the general formula (I) are those in which, in the said general formula: X denotes —O— or —NH—; $R^1$ denotes —CH = $CH_2$ or

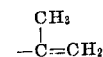

; $R^2$ and $R^3$ denote linear and/or branched alkyl radicals containing one to four carbon atoms, for example methyl, ethyl, propyl, isopropyl, n-butyl, isobutyl or tert-butyl groups or, together with the ammonium nitrogen atom, denote:

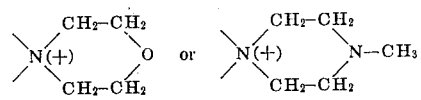

(i.e. $R^2$ and $R^3$ together may also denote a 0 ($CH_2$—$CH_2$)$_2$ radical) $R^4$ denotes H—, $CH_3$—, $CH_2$=CH-,

or —$CONH_2$, and $n$ denotes one of the integers from 1 to 4.

Examples of these are:

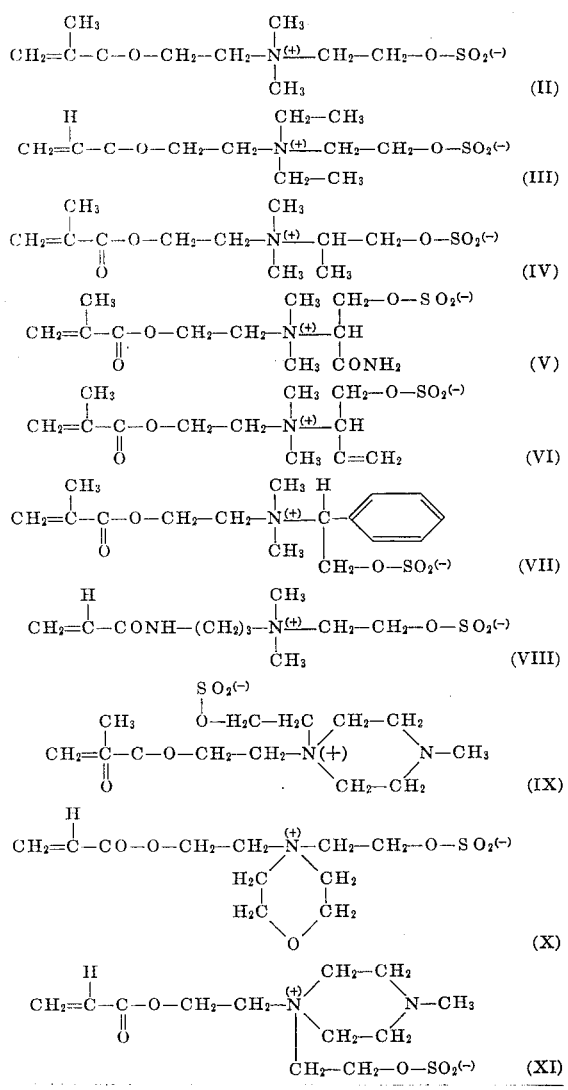

The olefinically unsaturated sulfitobetaines may for example be polymerized in bulk at room temperature or elevated temperature, in general at temperatures of from −15° to +150° C. The polymerization may be initiated for example by ionizing radiation or ultraviolet light or by conventional free radical generating catalysts. The sulfitobetaines may also be used in small amounts in the bulk polymerization of other monomers, for example in the bulk polymerization of styrene or of methyl methacrylate under otherwise conventional conditions. The olefinically unsaturated sulfitobetaines may also be polymerized with advantage as such or mixed with other olefinically unsaturated monomers in the presence of inert diluents and preferably with an additional of a conventional free radical generating initiator, particularly in aqueous systems, for example in aqueous solution, emulsion or suspension. Temperatures used are generally from about −5° to +150° C, mostly from 0 ° to 120° C and preferably at temperatures of from 20° to 95° C.

The conventional substances may be used as free radical generating initiators or polymerization catalysts; examples are water-soluble peroxidic compounds such as hydrogen peroxide, potassium persulfate, sodium persulfate, ammonium persulfate, perborates and conventional azo compounds which readily decompose into free radicals such as azoisobutyronitrile and azoisobutyramide, or also (especially for suspension polymerization) peroxidic compounds which dissolve with difficulty in water or not at all, such as benzoyl peroxide, cumene hydroperoxide and acetyl peroxide and if desired mixtures of catalysts of the said types. The free radical generating polymerization catalysts may be used in the conventional amounts, usually in amounts of from 0.1 to 5 percent, particularly from 0.2 to 1.5 percent by weight, based on the whole of the monomers.

Suitable other olefinically unsaturated monomers which may be mixed with the olefinically unsaturated sulfitobetaines to be polymerized include $\alpha,\beta$-olefinically unsaturated (i.e. monoolefinically unsaturated) monocarboxylic and/or dicarboxylic acids preferably having three to five carbon atoms such as acrylic acid, methacrylic acid, maleic acid, itaconic acid, fumaric acid and crotonic acid and/or their amides (which may bear N-methylol groups as substituents) such as acrylamide, methacrylamide, fumaramide, itaconamide, N-methylolacrylamide and/or N-methylolmethacrylamide. The amount of olefinically unsaturated sulfitobetaine is generally from 0.1 to 00.5 percent based on the total amount of water-soluble monomers, and acrylic acid and acrylamide are usually preferred for the copolymerization of the comonomers in aqueous solution.

In suspension and emulsion polymerization of the olefinically unsaturated sulfitobetaines there are generally used preponderant amounts of other olefinically unsaturated monomers which are insoluble in water such as 1,3-dienes containing four or five carbon atoms, for example butadiene, isoprene and chloroprene, monoolefins such as especially ethylene, esters of $\alpha,\beta$-olefinically unsaturated monocarboxylic and/or dicarboxylic acids which usually have three to five carbon atoms such as particularly esters of acrylic acid, methacrylic acid and maleic acid with alkanols containing one to twenty, particularly one to eight, preferably two to four, carbon atoms, for example the methyl, ethyl, n-propyl, isopropyl, n-butyl, isobutyl, tert-butyl, 2-ethylhexyl, lauryl and stearyl esters of acrylic and methacrylic acid, vinyl esters of saturated aliphatic monocarboxylic acids preferably containing three to 18 carbon atoms such as particularly vinyl acetate, vinyl propionate, vinyl n-butyrate, vinyl laurate and vinyl stearate, monovinylaromatic compounds such as particularly styrene halides, vinyl halides and/or vinylidene halides such as particularly vinyl chloride and vinylidene chloride, nitriles of $\alpha,\beta$-olefinically unsaturated monocarboxylic and dicarboxylic acids such as particularly acrylonitrile, and also vinyl ethers and vinyl ketones such as vinyl isobutyl ether and vinyl ethyl ketone. The amount of these monomers in the case of emulsion polymerization is usually from 80 to 99.9 percent, preferably from 85 to 99.45 percent, by weight based on the whole of the monomers. In suspension polymerization, which is particularly suitable for the polymerization of vinyl chloride and styrene, the amount of such other monomers is usually from 87 to 99.5 percent by weight based on the whole of the monomers. In the precipitation polymerization of acrylonitrile (in which acrylonitrile is polymerized in an inert liquid in which it is soluble, for example in a lower alkanol such as methanol, in which the acrylonitrile polymers are not soluble) the olefinically unsaturated sulfitobetaines are advantageously used in small amounts, for example in amounts of from 0.1 to 10 percent by weight based on the whole of the monomers.

In the suspension and emulsion polymerization of the sulfitobetaines there may also be copolymerized in minor amounts (as other olefinically unsaturated monomers) water-soluble olefinically unsaturated monomers of the type specified above such as acrylic acid and methacrylamide or also N-alkoxymethylamides of $\alpha,\beta$-olefinically unsaturated monocarboxylic or dicarboxylic acids having three to five carbon atoms which preferably contain one to four carbon atoms in the alkyl radical such as N-n-butoxymethylacrylamide, N-methoxymethylmethacrylamide and N-n-butoxymethylmethacrylamide, and also maleimide, N-acyloxymethylamides of $\alpha,\beta$-olefinically unsaturated monocarboxylic and dicarboxylic acids such as N-acetyloxymethylacrylamide and N-acetyloxymethylmethacrylamide, monoesters and diesters of monoolefinically unsaturated monocarboxylic acids and particularly alkanediols containing two to eight carbon atoms, for example glycol monoacrylate and diacrylate and butanediol-1,4 monoacrylate and diacrylate, vinylthioethanol and its derivatives, and also conventional monomers having allyl groups such as diallyl phthalate and allyl acrylate and also vinyl acrylate, vinyl methacrylate and divinylbenzene. In the emulsion copolymers prepared according to the new process, the amount of polymerized units of $\alpha,\beta$-olefinically unsaturated monocarboxylic and/or dicarboxylic acids and/or their amides (which may bear N-methylol, N-alkoxymethyl or acyloxymethyl groups as substituents) is usually from 0.1 to 10 percent, preferably from 0.5 to 5 percent, by weight based on the whole of the monomers. Generally speaking, comonomers of this type which have additional reactive groups in the polymerized units, are contained as polymerized units in amounts of from 0 to 10 percent by weight based on the whole of the monomers.

The suspension and emulsion polymerization of the sulfitobetaines may be carried out under conventional temperature and pressure conditions. Usually atmospheric pressure and temperatures of from 0° to 120° C, particularly from 20° to 100° C are used and if necessary conventional regulators, protective colloids and other additives may be used. The amount of olefinically unsaturated sulfitobetaine is generally from 0.01 to 10 percent, preferably from 0.05 to 1 percent, by weight in the case of emulsion copolymerization, and preferably from 0.5 to 3 percent by weight in the case of suspension polymerization, for example of vinyl chloride, in each case with reference to the whole of the monomers. If peroxide catalysts of the said type are used in the suspension or emulsion polymerization, the latter may be carried out at fairly low temperatures because these peroxide catalysts from redox systems with the sulfitobetaines. Adding a specific reducing agent is thereof not necessary if redox catalysts are to be used in the emulsion polymerization of sulfitobetaines with other olefinically unsaturated monomers. The new process may be carried out continuously or batchwise.

Conventional anionic and nonionic emulsifiers may be used in the new process when polymerization is carried out in aqueous emulsion, the amount of anionic emulsifiers preferably being within the range from 1 to 30 percent by weight based on the amount of sulfitobetaines. Nonionic emulsifiers are preferred for the emulsion polymerization; examples are oxyalkylation products of alkylphenols, such as n-nonylphenol and n-decylphenol, which are preferably derived from ethylene oxide and preferably contain from 5 to 30 ethylene oxide radicals and/or oxyalkylation products, particularly oxyethylation products, of fatty alcohols, fatty amines and fatty acid amides such as stearyl alcohol, sperm oil alcohol and stearamide which contain in particular from 5 to 25 ethylene oxide radicals. Sulfonation products of such alkylene oxide adducts and their salts are suitable as (anionic) emulsifiers. Alkyl sulfonates, alkylaryl sulfonates and condensation products of naphthalenesulfonic acid and formaldehyde are for example suitable as anionic emulsifiers. The amount of such emulsifiers is from 0.01 to 10 percent, preferably from 1 to 6 percent by weight based on the total amount of monomers. The amount of emulsified monomers in the emulsion polymerization of the sulfitobetaines may be within the conventional range, for example from 10 to 65 percent, preferably from 30 to 60 percent, by weight of total monomers based on the entire polymerization batch. The new aqueous dispersions prepared according to the new process accordingly contain in general from 10 to 65 percent, particularly from 30 to 60 percent by weight of the new copolymers containing sulfitobetaine groups based on the whole of the dispersion.

The new polymerization process gives new homopolymers and copolymers or new solutions or dispersions, for example aqueous solutions or dispersions of homopolymers or copolymers which contain sulfitobetaine groups, i.e. the polymers (which may be dissolved or dispersed) contain sulfitobetaine groups. The sulfitobetaine groups are probably not incorporated into the chain molecule of the polymer but are attached as side groups to the chain molecule in a similar manner to the ester groups in the case of acrylic ester polymers.

The new process provides for example homopolymers whose viscosity in aqueous solution in surprisingly little affected by the concentration. Dispersions of emulsion copolymers which have been prepared according to the new process have a fairly low viscosity, particularly when polymerization is carried out (as preferred) at a pH of up to 7, i.e. usually from 3 to 6.5.

Homopolymers of sulfitobetaines or copolymers which contain preponderant amounts of polymerized units of sulfitobetaines prepared according to the new process are suitable for example as reducing agents for dyes, for antistatic textile finishing and in some cases as sedimentation acids. Copolymers which have been prepared by polymerization in aqueous emulsion or suspension according to the new process and which contain preponderant amounts of polymerized units of other (water-insoluble) olefinically unsaturated monomers are suitable for applications where copolymers of this principal monomer are conventionally used for example as binders for nonwoven fabrics or paper coating compositions, as raw material for adhesives, as binders for surface coatings or for the production of expanded structures. Aqueous copolymer dispersions prepared according to the new process are free from specks and coagulate, and resistant to mechanical and thermal stresses and to the addition of electrolytes. Films prepared therefrom exhibit good adherence to a great variety of supports, the adherence being superior to that of films of comparable copolymers which contain polymerized units of vinylsulfonic acid or sulfobetaines instead of polymerized units of sulfitobetaines. Aqueous dispersions prepared according to the new process are moreover low in froth and have good compatibility with pigments. The new copolymers have a better cohesion than copolymers containing polymerized units of vinyl sulfonate instead of sulfitobetaines and this is particularly of interest for raw materials for adhesives.

The following Examples illustrate the invention. The parts and percentages specified in the Examples are by weight.

The K values given in the examples are determined according to H. Fikentscher, Cellulose Chem., Vol. 13 (1932), pages 58 ff.

EXAMPLE 1

1030 parts of water, 33 parts of sodium paraffin sulfonate (chain length $C_{12}$ to $C_{18}$), 1.4 parts of N,N-dimethyl-N-$\beta$-methacrylatoethyl-N-$\beta$sulfitoethylammoniumbetaine, 5.6 parts of sodium pyrophosphate and 4.2 parts of acrylamide are mixed in a stirred vessel. The pH value of the mixture is adjusted to 6 by adding phosphoric acid and then there are added 4.2 parts of sodium persulfate, 520 parts of vinyl chloride and 840 parts of vinylidene chloride. The whole is then heated to 57° C and polymerized at this temperature for 25 hours. A 55 percent aqueous dispersion of a copolymer is obtained which has a K value of 45. The dispersion is suitable for coating paper.

Production of N,N-dimethyl-N-$\beta$-methacrylatoethyl-N-$\beta$-sulfitoethylammoniumbetaine 70 parts of sulfur dioxide and 48.5 parts of ethylene oxide are passed into a solution of 157 parts of N,N-dimethylaminoethyl methacrylate in 100 parts of acetone at 20° to 25° C while stirring in the course of 2 hours. The whole is then stirred for another three hours at 30° C and the sulfitobetaine formed is allowed to separate out at 0° C. 256 parts of N,N-dimethyl-N-$\beta$-methacrylatoethyl-N-$\beta$-sulfitoethylammoniumbetaine is obtained in the form of a mass which solidifies into yellow crystals ($n_D^{20} = 1.5088$).

EXAMPLE 2

1,000 parts of n-butyl acrylate and 500 parts of vinyl acetate are emulsified in a solution of 40 parts of sodium paraffin sulfonate (chain length $C_{12}$ to $C_{18}$), 1.5 parts of N,N-dimethyl-N-$\beta$-methacrylato-ethyl-N-$\beta$-sulfitoethylammoniumbetaine, 8 parts of sodium pyrophosphate, 10 parts of acrylic acid and 6 parts of potassium persulfate in 1160 parts of water. 300 parts of this monomer emulsion is mixed in a stirred vessel with a solution of sodium paraffin sulfonate (chain length $C_{12}$ to $C_{18}$) in 210 parts of water and the mixture is heated to 90°C. After polymerization has begun, the remainder of the monomer emulsion is added in the course of about two hours. Polymerization is then continued for another 3 hours at 90° C. An about 60 percent aqueous copolymer dispersion is obtained which can be used for example as a raw material for adhesives.

EXAMPLE 3

A solution of 2 parts of potassium persulfate in 450 parts of water is heated to 82° C in a stirred vessel. Feeds (I) and (II) described below are then introduced into the heated solution simultaneously during 6 hours.

Feed (I): 600 parts of water, 60 parts of sodium paraffin sulfonate (chain length $C_{12}$ to $C_{18}$), 1270 parts of styrene, 10 parts of N,N-dimethyl-N-$\beta$-methacrylatoethyl-N-$\beta$-sulfitoethylammoniumbetaine.

Feed (II): 100 parts of water, 0.25 parts of potassium persulfate.

Following the introduction of feeds (I) and (II), polymerization is carried on for another hour at 82°C. A 50 percent aqueous dispersion of a sulfitobetaine copolymer is obtained which can be used as a binder for pigments.

EXAMPLE 4

4 parts of sodium paraffin sulfonate (chain length $C_{12}$ to $C_{18}$), 0.55 part of N,N-dimethyl-N-$\beta$-methacrylatoethyl-N-$\beta$-sulfitoethyl-ammoniumbetaine, 5.6 parts of sodium pyrophosphate and 3.3 parts of potassium persulfate are dissolved in 400 parts of water in a stirred vessel. The solution is heated to 90° C and in the course of 2 hours the following feeds (I) and (II) are added:

Feed (I). 500 parts of water, 25 parts of sodium paraffin sulfonate (chain length $C_{12}$ to $C_{18}$), 2.25 parts of N,N-dimethyl-N-$\beta$-methacrylatoethyl-N-$\beta$-sulfitoethylammoniumbetaine, 1,000 parts of 2-ethylhexyl acrylate, 90 parts of acrylonitrile and 30 parts of acrylic acid;

Feed (II): 90 parts of water and 3.4 parts of potassium persulfate.

An aqueous solution of 1.1 parts of potassium persulfate which is as highly concentrated as possible is then added and polymerization is continued for another 2 hours at 90° C. An about 50 percent aqueous dispersion is obtained which can be used as a raw material for adhesives.

EXAMPLE 5

480 parts of styrene, 20 parts of acrylic acid and 10 parts of N,N-dimethyl-N-$\beta$-methacrylatoethyl-N-$\alpha$-carbamido-$\beta$-sulfitoethylammoniumbetaine are added while stirring to an aqueous solution of 20 parts of sodium lauryl sulfate, 20 parts of the bis-di-n-octyl ester of sodium sulfosuccinic acid and 5 parts of potassium persulfate in 2,000 parts of water in a pressuretight reaction vessel. After thorough flushing with nitrogen, 500 parts of liquid butadiene is added and polymerization is carried on for twenty hours at 55° C while stirring. Then the pH of the dispersion obtained is brought to 8. A 33 percent aqueous dispersion of a butadiene copolymer is obtained which is suitable as a binder for nonwoven fabrics.

Production of N,N-dimethyl-N-$\beta$-methacrylatoethyl-N-( -carbamido-$\beta$-sulfito)-ethylammoniumbetaine 160 parts of N,N-dimethylaminoethyl methacrylate is dissolved in 50 parts of methanol and the solution obtained is stabilized by adding 2,000 ppm of p-nitrosophenol. 64 parts of sulfur dioxide and a solution of 87 parts of glycidamide in 50 parts of methanol are added simultaneously to the solution while stirring. After reaction for 4 hours, the methanol is distilled off under subatmospheric pressure and a slowly crystallizing oil is obtained as a residue. The melting point of N,N-dimethyl-N-β-methacrylatoethyl-N-(α-carbamido-β-sulfito)-ethylammoniumbetaine is 89° to 92° C.

EXAMPLE 6

500 parts of styrene, 10 parts of acrylic acid and 90 parts of acrylonitrile is added while stirring to a solution of 30 parts of sodium lauryl sulfate, 5 parts of potassium persulfate and 5 parts of N,N-dimethyl-N-β-methacrylatoethyl-N-(α-vinyl-β-sulfito)-ethylammoniumbetaine in 1,000 parts of water in a pressuretight reaction vessel. After flushing with nitrogen, 400 parts of liquid butadiene is added and then polymerization is carried on for twenty hours at 55° C. The pH of the dispersion is then adjusted to 8 with ammonia. A 50 percent aqueous dispersion of a butadiene copolymer is obtained which is suitable as a binder for paper coating compositions.

Production of N,N-dimethyl-N-β-methacrylatoethyl-N- (α-vinyl-β-sulfito)-ethylammoniumbetaine 64 parts of sulfur dioxide and 70 parts of butadiene monoxide are added simultaneously during two hours at 25° C to a solution of 160 parts of N,N-dimethylaminoethyl methacrylate in 100 parts of methanol which contains 2,000 ppm of nitrosophenol. The whole is allowed to react for another three hours at room temperature and then the methanol is distilled off under subatmospheric pressure. N,N-dimethyl-N-β-methacrylatoethyl-N-(α-vinyl-β-sulfito)-ethylammoniumbetaine is obtained as a residue in the form of a brown oil;

$N_D^{20} = 1.5005$.

EXAMPLE 7

0.3 part of a 50 percent aqueous hydrogen peroxide solution is added to 100 parts of a 30 percent aqueous solution of N,N-dimethyl-N-β-methacrylatoethyl-N-β-sulfitoethylammoniumbetaine. Polymerization begins immediately. The temperature of the mixture is kept for one hour at 80° C and a mobile solution of the homopolymer is obtained which has a K value of 33 measured in a 0.5 percent aqueous solution. An aqueous solution of the polymer obtained is suitable as a reducing agent.

EXAMPLE 8

0.5 part of a 50 percent aqueous solution of hydrogen peroxide is added to 100 parts of a 50 percent aqueous solution of N,N-dimethyl-N-(γ-methacrylamido)-propyl-N-β-sulfitoethylammoniumbetaine. Polymerization begins immediately and the temperature of the reaction mixture is kept at 80° C for 1 hour. A mobile solution of the homopolymer is obtained whose viscosity amounts to 28 centistrokes. The homopolymer has a K value of 45 measured in 0.5 percent aqueous solution. The solution may be used for example for the reduction of vat dyes.

Production of N,N-dimethyl-N-(γ-methacrylamido)-propyl-N-β-sulfitoethylammoniumbetaine 64 parts of sulfur dioxide and 44 parts of ethylene oxide are added simultaneously at 25° C to a solution of 245 parts of N,N-dimethyl-N-propyl-γ-methacrylamide in 100 parts of methanol which contains 0.2 percent of p-nitrosophenol. The whole is stirred for another 4 hours at 25° C and the methanol distilled off under subatmospheric pressure. The residue is N,N-dimethyl-N-(γ-methacrylamido)-propyl-N-β-sulfitoethylammoniumbetaine in the form of a brown tough resin;

$n_D^{55} = 1.534$.

EXAMPLE 9

1,200 parts of water, 12 parts of a 10 percent aqueous solution of polyvinyl alcohol (saponification number 300), 12 parts of a 10 percent solution of sodium diisobutylnaphthalene sulfonate, 12 parts of N,N-dimethyl-N-β-methacrylatoethyl-N-(γ-methyl-β-sulfito)-ethylammoniumbetaine and 0.8 part of dibenzoyl peroxide are placed in a pressure tight reaction vessel which is then flushed out with nitrogen. 600 parts of vinyl chloride is added and polymerization is carried out for 35 hours at 55° C while stirring. Beads of vinyl chloride polymer are obtained which after having been washed with water and dried have a K value of 65, determined in 0.5 percent solution in cyclohexanone. They are suitable for the production of shaped articles by the methods conventionally used for processing polyvinyl chloride, for example by extrusion or injection molding.

Production of N,N-dimethyl-N-β-methacrylatoethyl-N- (α-methyl-β-sulfito)-ethylammoniumbetaine 64 parts of sulfur dioxide and 58 parts of propylene oxide are passed simultaneously at 20° C in the course of three hours into a solution of 160 parts of N,N-dimethylaminoethyl methacrylate in 160 parts of methanol which contains 0.2 percent of p-nitrosophenol. Methanol is distilled off at subatmospheric pressure from the reaction product. N,N-dimethyl-N-β-methacrylatoethyl-N-(α-methyl-β-sulfito)-ethylammoniumbetaine is obtained as a distillation residue in the form of a red brown paste; $n_D^{20} = 1.4978$.

EXAMPLE 10

3 parts of N,N-dimethyl-N-β-methacrylatoethyl-N- (α-phenyl-β-sulfito)-ethylammoniumbetaine is added to 100 parts of a 30 percent aqueous solution of acrylamide and then, after the betaine has dissolved, 0.1 part of potassium persulfate and 0.05 part of sodium formaldehyde sulfoxylate hydrate are added while stirring. The polymerization reaction begins immediately. After polymerization has proceeded for 2 hours a polymer solution is obtained. The K value of the polymer (determined in a 0.1 percent aqueous solution) is 150. The polymer is suitable for example as a flocculant.

Production of N,N-dimethyl-N-β-methacrylatoethyl-N- (α-phenyl-β-sulfito)-ethylammoniumbetaine 64 parts of sulfur dioxide and 25 parts of styrene oxide are added simultaneously at 30° C to a solution of 160 parts of N,N-dimethylaminoethyl methacrylate in 100 parts of methanol which contains 0.2 percent of p-nitrosophenol as a stabilizer and the whole is stirred for 4 hours at 30° C. The methanol is distilled off at subatmospheric pressure and, as a residue, N,N-dimethyl-N-

β-methacrylatoethyl-N-(α-phenyl-β-sulfito)-ethylammoniumbetaine is obtained in the form of a red brown oil;
$n_D^{20} = 1.5192$.

EXAMPLE 11

100 parts of a 15 percent aqueous solution of acrylic acid is neutralized (pH 7) with caustic soda solution. 1.5 parts of N-β-sulfitoethyl-N-β-methacrylatoethyl-N-methylpiperaziniumbetaine is added to the solution obtained and, while stirring, 0.05 part of a 50 percent aqueous solution of hydrogen peroxide and 0.01 part of ascorbic acid are added. Polymerization begins immediately and after 2 hours a polymer solution is obtained. The polymer has a K value of 30 determined in a 0.1 percent aqueous solution and is suitable for example for soilproofing textiles.

Production of N-β-sulfitoethyl-N-β-methacrylatoethyl- N-methylpiperaziniumbetaine 64 parts of sulfur dioxide and 44 parts of ethylene oxide are added simultaneously at 25° C to a solution of 224 parts of β-N-methylpiperaziniumethyl acrylate in 100 parts of methanol which contains 0.2 percent of p-nitrosophenol and reaction is allowed to take place for 3 hours with stirring. The methanol is then distilled off at subatmospheric pressure, N-β-sulfitoethyl-N-β-methacrylatoethyl-N-methylpiperaziniumbetaine being obtained as a residue in the form of a yellow oil;
$n_D^{20} = 1.5202$.

EXAMPLE 12

A mixture of 600 parts of ethyl acetate and 8 parts of N-β-sulfitoethyl -N-β-acrylatoethylmorpholiniumbetaine is heated to 60° C in a stirred vessel and a mixture of 400 parts of ethyl acrylate and 0.5 part of dibenzoyl peroxide is added uniformly in the course of 3 hours. A solution of 0.2 part of dibenzoyl peroxide in 50 parts of ethyl acetate is added to the mixture during 15 minutes. Polymerization is over after ten hours. A colorless solution is obtained having a viscosity of 110 poises. The solution is suitable as a coating intermediate.

Production of N-β-sulfitoethyl-N-β-acrylatoethyl-morpholiniumbetaine 128 parts of sulfur dioxide and 88 parts of ethylene oxide are added simultaneously at 25°C in the course of 2 hours while stirring to a solution of 370 parts of β-morpholylethyl acrylate in 200 parts of methanol which contains 0.2 percent of p-nitrosophenol. The methanol is then distilled off at subatmospheric pressure and N-β-sulfitoethyl- N-β-acrylatoethylmorpholiniumbetaine is obtained as a residue in the form of a red brown oil;
$n_D^{20} = 1.4915$.

EXAMPLE 13

0.4 part of dibenzoyl peroxide and 6 parts of a 20 percent aqueous solution of polyvinylpyrrolidone are added to a mixture of 225 parts of acrylonitrile, 25 parts of N-β-sulfitoethyl-N-β-acrylatoethyl-N-methyl-piperaziniumbetaine and 750 parts of methanol. The whole is heated to 60° C and polymerization is carried on for 5 hours at this temperature while stirring. The copolymer separates out in finely divided form. The whole is allowed to cool and the unreacted acrylonitrile and solvent are removed by steam distillation. 200 parts of a copolymer is obtained which has a K value of 60 measured in a 0.5 percent solution in cyclohexanone. It is suitable for example as a fiber intermediate.

Production of N-β-sulfitoethyl-N-β-acrylatoethyl-N-methylpiperaziniumbetaine 78 parts of sulfur dioxide and 53 parts of ethylene oxide are added simultaneously at 25° C in the course of two hours to a solution of 238 parts of β-N-methyl-piperaziniumethyl acrylate in 240 parts of methanol which contains 0.2 percent of p-nitrosophenol. The whole is stirred for another 2 hours at 25° C, the methanol is distilled off at subatmospheric pressure and N-β-sulfitoethyl-N-β-acrylatoethyl-N-methyl-piperaziniumbetaine is obtained as a residue in the form of a brown oil;
$n_D^{20} = 1.5033$.

We claim:
1. A process for the production of aqueous dispersions of copolymers containing sulfitobetaine radicals wherein
   1. 0.01 to 10 percent by weight of an olefinically unsaturated sulfitobetaine having the general formula

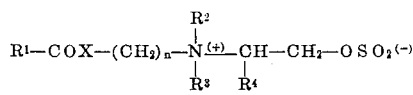

where X denotes a radical selected from the class consisting of —O— and

denotes a radical selected from the class consisting of —CH = CH₂ and

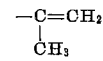

R² and R³ denote alkyl containing one to four carbon atoms, R² and R³ together with the ammonium nitrogen atom may denote a radical selected from the class consisting of

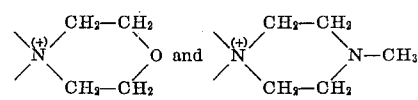

R⁴ denotes a radical selected from the class consisting of -H, —CONH₂, —CH = CH₂,

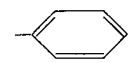

and —CH₃, and n denotes an integer from 1 to 4,
   2. 0 to 10 percent by weight of a comonomer selected from the class consisting of monoolefinically unsaturated monocarboxylic and dicarboxylic acids containing three to five carbon atoms, amides of monoolefinically unsaturated monocarboxylic and dicarboxylic acids having three to five carbon atoms and N-methylolamides of monoolefinically unsaturated monocarboxylic and dicarboxylic acids having three to five carbon atoms, and
   3. 80 to 99.99% by weight of a comonomer selected from the class consisting of 1,3-dienes containing four or five carbon atoms, esters of monoolefinically unsaturated monocarboxylic and dicarboxylic acids containing three to five carbon atoms with alkanols containing one to 20 carbon atoms, vinyl esters of saturated aliphatic monocarboxylic acids containing three to 18 carbon atoms, ethylene, styrene, vinyl chloride, vinylidene chloride and acrylonitrile are copolymerized in aqueous emulsion at temperatures of from 20° and 100° C, said emulsion containing 0.1 to 10 percent by weight of a conventional emulsifier and 0.1 to 5 percent by weight of a conventional free radical generating polymerization initiator, said percentages being based on the total amount of the monomers.

2. An aqueous dispersion of a copolymer having sulfitobetaine radicals attached to its chain molecules containing in dispersed form 10 to 65 percent by weight, based on the dispersion, of a copolymer which contains in polymerized form:

1. 0.01 to 10 percent by weight of an olefinically unsaturated sulfitobetaine having the general formula

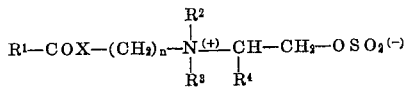

where X denotes a radical selected form the class consisting of —O— and

$R^1$ denotes a radical selected from the class consisting of —CH = $CH_2$ and

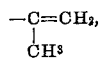

$R^2$ and $R^3$ denote alkyl containing one to four carbon atoms, $R^2$ and $R^3$ together with the ammonium nitrogen atom may denote a radical selected from the class consisting of

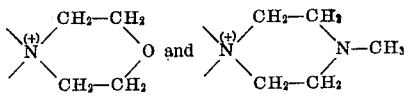

$R^4$ denotes a radical selected from the class consisting of -H, -$CONH_2$, —CH = $CH_2$,

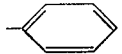

and —$CH_3$, and $n$ denotes an integer from one to four 2. 0 to 10 percent by weight of a comonomer selected from the class consisting of monoolefinically unsaturated monocarboxylic and dicarboxylic acids containing three to five carbon atoms, amides of monoolefinically unsaturated monocarboxylic and dicarboxylic acids having three to five carbon atoms and N-methylolamides of monoolefinically unsaturated monocarboxylic and dicarboxylic acids having three to five carbon atoms, and 3. 80 to 99.99 percent by weight of a comonomer selected from the class consisting of 1,3-dienes containing four to five carbon atoms, esters of monoolefinically unsaturated monocarboxylic and dicarboxylic acids containing three to five carbon atoms, with alkanols containing one to 20 carbon atoms, vinyl esters of saturated aliphatic monocarboxylic acids containing three to 18 carbon atoms, ethylene, styrene, vinyl chloride, vinylidene chloride and acrylonitrile.

3. An aqueous dispersion as claimed in claim 2 wherein the comonomer (3) consists of vinyl chloride and vinylidene chloride.

4. An aqueous dispersion as claimed in claim 2 wherein the comonomer (3) consists essentially of said esters.

5. An aqueous dispersion as claimed in claim 2 wherein the comonomer (3) consists essentially of styrene.

6. An aqueous dispersion as claimed in claim 2 wherein the comonomer (3) consists essentially of an acrylate ester and a small amount of acrylonitrile.

7. An aqueous dispersion as claimed in claim 2 wherein the comonomer (3) consists essentially of styrene and butadiene.

* * * * *